United States Patent
Bergamini et al.

(10) Patent No.: US 11,178,891 B2
(45) Date of Patent: Nov. 23, 2021

(54) PROCESS FOR THE PRODUCTION OF A NEST-SHAPED FOOD PRODUCT COMPRISING STRIPS OF A DRIED VEGETABLE AND ASSOCIATED PRODUCT

(71) Applicant: Barilla G. e R. Fratelli S.p.A., Parma (IT)

(72) Inventors: Elena Bergamini, Brescello (IT); Nadia Morbarigazzi, Parma (IT); Oreste Caselli, Bibbiano (IT); Paolo Bertolini, Neviano degli Arduini (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 133 days.

(21) Appl. No.: 16/561,624

(22) Filed: Sep. 5, 2019

(65) Prior Publication Data

US 2021/0022375 A1  Jan. 28, 2021

(30) Foreign Application Priority Data

Jul. 22, 2019 (IT) ........................ 102019000012522

(51) Int. Cl.
*A23B 7/02* (2006.01)
*A23L 7/113* (2016.01)
(Continued)

(52) U.S. Cl.
CPC ............ *A23L 7/113* (2016.08); *A23B 7/0053* (2013.01); *A23B 7/022* (2013.01); *A23B 7/0205* (2013.01);
(Continued)

(58) Field of Classification Search
CPC . A23L 7/113; A23L 19/03; A23L 5/17; A23L 3/40–54; A23L 3/02–245;
(Continued)

(56) References Cited

U.S. PATENT DOCUMENTS 3,622,401 A * 11/1971 McCullough ......... C23F 11/167
428/470
3,892,874 A * 7/1975 Ando ...................... A23L 7/111
426/303
(Continued)

FOREIGN PATENT DOCUMENTS

| CN | 107684057 A | 2/2018 |
|---|---|---|
| CN | 108208571 A | 6/2018 |
| WO | 96/19113 A1 | 6/1996 |

OTHER PUBLICATIONS

Mintel, "Courgetti Nests", pp. 1-4, Record No. 4087605, XP055653860, Jul. 26, 2016.
(Continued)

*Primary Examiner* — Drew E Becker
(74) *Attorney, Agent, or Firm* — Lucas & Mercanti, LLP (57) ABSTRACT

A process for the production of a nest-shaped food product containing strips of a dried vegetable, preferably a garden vegetable, storable at room temperature for at least 7 days is disclosed. The process involves providing at least one fresh vegetable which has been previously washed, cutting the vegetable into strips, feeding the vegetable strips in metered amounts into a perforated mold, subjecting the strips to a stabilization heat treatment by means of saturated steam, drying the thermally stabilized strips by means of a flow of hot air so as to obtain a nest containing dried strips of vegetable with a moisture content of between 8% and 16% by weight of their total weight. The invention also concerns a nest-shaped food product which is obtained by means of the process and which may optionally contain strips of durum wheat semolina pasta.

18 Claims, 4 Drawing Sheets
(4 of 4 Drawing Sheet(s) Filed in Color)

(51) Int. Cl.
*A23L 19/00* (2016.01)
*A23B 7/005* (2006.01)
*A23B 7/06* (2006.01)
*A23B 7/10* (2006.01)
*A23L 5/10* (2016.01)
*A23B 7/022* (2006.01)

(52) U.S. Cl.
CPC .............. *A23B 7/0215* (2013.01); *A23B 7/06* (2013.01); *A23B 7/10* (2013.01); *A23L 5/13* (2016.08); *A23L 5/17* (2016.08); *A23L 19/03* (2016.08); *A23V 2002/00* (2013.01)

(58) Field of Classification Search
CPC ....... A23L 5/13; A23B 7/0205; A23B 7/0053; A23B 7/02; A23B 7/005–0056; A23B 7/0215; A23B 7/06; A23B 7/08–12
USPC .......................................................... 426/640
See application file for complete search history.

(56) References Cited

U.S. PATENT DOCUMENTS

| | | | | |
|---|---|---|---|---|
| 3,974,301 | A * | 8/1976 | Luh ...................... | A23B 7/0205 426/640 |
| 4,185,125 | A * | 1/1980 | Sakakibara ............... | A23L 5/11 426/439 |
| 4,496,597 | A * | 1/1985 | Reges .................. | A23B 7/0056 426/400 |
| 4,614,660 | A * | 9/1986 | Weibye ................ | A23B 7/0053 426/461 |
| 5,379,527 | A * | 1/1995 | Su ........................ | A23B 7/0205 219/400 |
| 5,410,951 | A * | 5/1995 | Ledet ..................... | A23L 3/185 99/443 C |
| 5,955,130 | A * | 9/1999 | Gagliardi ................ | A23L 19/01 426/241 |
| 6,027,757 | A * | 2/2000 | Menon ................. | A23B 7/0205 426/443 |
| 6,086,933 | A * | 7/2000 | Rockstrom .......... | A23B 7/0205 426/243 |
| 6,132,794 | A * | 10/2000 | Sinha ...................... | A23L 19/03 426/615 |
| 7,014,879 | B1 | 3/2006 | Lewis et al. | |
| 7,374,789 | B2 * | 5/2008 | Dameno ................. | A23L 7/111 426/451 |
| 2002/0086099 | A1 * | 7/2002 | Shim ....................... | A23L 27/14 426/615 |
| 2005/0084576 | A1 * | 4/2005 | Sakuma ................. | A23B 7/0205 426/509 |
| 2010/0028509 | A1 * | 2/2010 | Kageyama .......... | A21D 10/025 426/324 |
| 2013/0122173 | A1 * | 5/2013 | Nagayama ................. | A23L 3/40 426/557 |
| 2013/0287921 | A1 | 10/2013 | Nagayama | |
| 2013/0337122 | A1 * | 12/2013 | Falquerho ................. | A23L 5/43 426/250 |
| 2014/0141138 | A1 * | 5/2014 | Gaus ....................... | A23L 27/26 426/281 |
| 2015/0086689 | A1 * | 3/2015 | Machida ................. | A23L 7/113 426/438 |
| 2016/0066607 | A1 * | 3/2016 | Kaper ..................... | A23L 19/03 426/615 |
| 2018/0338515 | A1 * | 11/2018 | Cheetham ................. | A23L 5/17 |
| 2019/0021377 | A1 * | 1/2019 | Rolli .................... | A23B 7/0441 |
| 2019/0297927 | A1 * | 10/2019 | Novak ................... | A21D 2/362 |
| 2020/0315187 | A1 * | 10/2020 | Briant ..................... | A23L 19/05 |
| 2021/0112834 | A1 * | 4/2021 | Zhang ..................... | A21D 2/02 |

OTHER PUBLICATIONS

Mintel, "Courgetti Nests", pp. 1-2, Record No. 4374443, XP055653872, Oct. 25, 2016.
M.J. Lewis, "Properties of Gases and Vapours", Book Chapter 11, Physical Properties of Foods and Food Processing Systems, pp. 324-365, XP055654011, 1990.
Bill, "Chinese Seafood Bird Nest, A Chinese Banquet Dish", The Woks of Life, pp. 1-39, XP055653640, 2019.
International Search Report and Written Opinion for Italian Application No. IT 201900012522 (13 Pages) (dated Dec. 19, 2019).

* cited by examiner

PROCESS FOR THE PRODUCTION OF A NEST-SHAPED FOOD PRODUCT COMPRISING STRIPS OF A DRIED VEGETABLE AND ASSOCIATED PRODUCT

CROSS-REFERENCE TO RELATED APPLICATIONS

This application claims the benefit of priority from Italian patent application No. 102019000012522 filed on Jul. 22, 2019, the contents of which are incorporated herein by reference.

FIELD OF APPLICATION

The present invention relates to a process for the preparation of a food product, obtained from fresh vegetables, preferably garden vegetables. Specifically, this process involves the preparation of a food product comprising a vegetable dried in the form of strips.

The present invention also relates to a product of the aforementioned type, which can be stored at room temperature for a medium to long period of time and, optionally, also comprises durum wheat semolina pasta in strips.

BACKGROUND OF THE INVENTION

The production of pasta-type foods containing vegetables or garden vegetables in variable portions is known in the art.

Commonly, during the normal production of the dough, together with water and flour, one or more finely divided garden vegetables are added, which garden vegetables may be freshly harvested or may have previously been subjected to comminution and/or drying treatments, for example to obtain a dry powder or pasteurized puree.

Foods of this type are widespread in Italian and Austrian cuisine and are mostly sold as fresh foods to be stored under refrigerated conditions. This type of fresh product includes, for example, potato gnocchi made from other garden vegetables, such as spinach or chard. For example, in Trentino-Alto Adige, "spinatspatzle", i.e. gnocchi-like pasta made from soft wheat flour, spinach and eggs, are very common.

However, these foods can generally only be stored in a refrigerated environment and for a limited period of time: they are sold in a modified atmosphere packaging and can be stored in a refrigerator, normally for 3-4 weeks.

There also exist similar products, such as potato gnocchi which are packaged in a controlled atmosphere and which may be stored at room temperature for an extended period of time. However, these foods must be pasteurized beforehand and also contain preservatives, such as sulphites.

Products such as dried durum wheat pasta, prepared by adding garden vegetables during the preparation of the dough, which can be stored at room temperature and have a long shelf life, similar to conventional durum wheat pasta, are also known.

These products are characterized by an attractive color and delicate flavor, which is similar to that of the vegetable ingredient used, e.g. tomato, spinach, chard or beetroot, but is much less intense. In any case, although similar to dried durum wheat pasta from the point of view of both cooking methods and the consistency of the cooked product when tasted and the storage conditions, these products do not guarantee a high nutritional content in terms of fibers and other nutrients typical of certain types of garden vegetables.

In fact, the aforementioned dried durum wheat pasta products are prepared by incorporating into the flour and water dough a portion of pasteurized garden vegetable puree or a garden vegetable extract; commonly no more than 25% by weight of garden vegetables relative to the total weight of the final dried product.

There exists therefore a very important need in the sector to provide a product with a fiber and nutritional content which is similar to that of fresh garden vegetables and which at the same time can be stored at room temperature.

Patent application CN108208571 describes a process for producing noodles from a dough of chopped garden vegetables and flour. In particular, after the fresh garden vegetables have been washed, centrifuged and dried, they are reduced to a juice, which then undergoes a drying treatment at 40° C. under a vacuum, followed by its reduction into powder form. The powder thus obtained is mixed with flour and water to obtain a homogeneous dough. Finally, the dough is rolled out and cut into strips, so as to obtain a product in the form of noodles.

However, even in this case, although it is a product similar to durum wheat pasta with regard to appearance and storage methods, the noodles of the patent application CN108208571 cannot be regarded as a food able to guarantee a high nutritional content, in terms of fibers and other substances which are typical of garden vegetables.

Furthermore, foods made from fresh garden vegetables cut into strips with a shape and size similar to that of long pasta, such as tagliolini or spaghetti, are known, but these can only be stored in refrigerated or deep-frozen conditions.

In particular, in the Italian market, foods obtained from fresh garden vegetables, in the form of strips or so-called spaghetti, sold in modified atmosphere single-portion or double-portion trays and able to be stored under refrigerated conditions, are known.

Before consumption, it is suggested cooking this type of product in a pan with water for a few minutes, so as to obtain a strip-shaped food based on garden vegetables, such as carrots, zucchini and/or beetroot, which can then be served together with sauces, in the same way as durum wheat pasta, or together with fresh foodstuffs, such as mozzarella, seeds or cheese, in the manner of a salad.

This latter type of food, therefore, besides not being able to be stored at room temperature, does not even have a cooking method similar to that of traditional dried durum wheat pasta.

Methods of drying raw vegetables, so as to obtain vegetables in dried form which can be stored at room temperature, are also known.

The patent application CN107684057 describes a method for producing dehydrated garden vegetables which comprises the steps of washing, cutting into sections, initial cooking in boiling water, initial dehydration, secondary cooking in boiling water and secondary dehydration.

However, the dried product thus obtained, in addition to having a low nutritional content due to the aforementioned boiling steps, may be rehydrated by cooking in hot water at 80° C. for 3 minutes and therefore, does not have a cooking method comparable to that of dried durum wheat pasta.

Basically, the technical problem underlying the present invention was to provide a food based on vegetables, preferably garden vegetables, without preservatives and with nutritional and organoleptic characteristics as similar as possible to those of the original fresh vegetable, which could be stored at room temperature for a medium to long period and with a cooking method as well as an appearance, entirely similar to those of traditional durum wheat semolina pasta.

SUMMARY OF THE INVENTION

This technical problem has been solved, according to the invention, by a process for the production of a nest-shaped food product comprising strips of a dried vegetable, storable at room temperature for a time period of at least 7 days, which comprises the steps of:

a) providing at least one fresh vegetable;

b) cutting into strips said at least one fresh vegetable, previously washed and optionally peeled;

c) feeding said strips of vegetable in metered amounts into a perforated mold;

d) subjecting the strips of vegetable to a stabilization heat treatment by means of saturated steam at a temperature of between 95° C. and 105° C., for a time of between 30 seconds and 5 minutes; and e) drying the thermally stabilized strips of vegetable by means of a flow of hot air at a temperature of between 65° C. and 90° C., so as to obtain a nest comprising these dried strips of vegetable with a moisture content of between 8% and 16% by weight of their total weight.

In particular, the aforementioned nest-shaped food product comprising strips of a dried vegetable can be stored at room temperature in a controlled atmosphere for the aforementioned time period. For example, it can be stored in a low oxygen atmosphere, in an inert atmosphere or under partial vacuum conditions; conveniently, this food product can be stored in single-portion or multi-portion packs for a medium to long period of time.

Advantageously, this food product may be packaged together with other foods, including fresh or dried pasta.

The aforementioned time period is preferably at least 30 days, more preferably 60 days, conveniently at least 180 days, and advantageously 210 days.

In a particularly preferred manner, it is possible to produce a food product which can be stored at room temperature for a time period of up to 12 months.

For the purposes of the present invention, the expression "fresh vegetable" is understood as meaning portions of plants such as fruits, roots, bulbs, rhizomes, stems or any combination of these, harvested fresh and optionally stored in a controlled atmosphere and/or under refrigeration conditions until used in accordance with the present process.

In particular, according to the present process, said at least one fresh vegetable has not undergone preliminary cooking and, more generally, microbiological stabilization treatments such as pasteurization, sterilization, dehydration, freezing or freeze-drying.

Preferably, said at least one fresh vegetable may be a portion of a plant belonging to any family in the group comprising Cucurbitaceae, Brassicaceae, Liliaceae and/or belonging to a species selected from *Daucus carota, Beta vulgaris, Brassica rapa* or *Raphanus sativus*. For example, said at least one fresh vegetable may be a portion of a plant of a garden vegetable selected from the group comprising orange carrot, purple carrot, yellow carrot, beetroot, white turnip, daikon, broccoli stems, pumpkin, zucchini or onion.

Therefore, with the process according to the present invention it is possible to produce a nest comprising dried strips of at least one vegetable, in which said at least one vegetable, initially supplied fresh, is stabilized and then dried, so as to obtain a final product which can be stored at room temperature for a long period of time.

Advantageously, the aforementioned stabilization step d) ensures, on the one hand, the inactivation of the enzyme activity in these vegetable strips and, on the other hand, their microbiological stabilization, by means of a heat treatment which does not cause deterioration of the food from an organoleptic point of view.

Specifically, with the process according to this invention it is possible to obtain a nest comprising dried strips of at least one vegetable, without the aid of preservatives or anti-microbial agents; therefore, the process according to this invention results in a product which is free from preservatives or anti-microbial agents, and therefore is of an entirely genuine nature.

In an equally advantageous manner, said stabilization step d) allows preparation of the vegetable ingredient, i.e. said strips of vegetable, in such a way that they release water during the subsequent drying step e).

In other words, during this stabilization step d), the structure of the fibrous tissues of these vegetable strips is weakened and softened.

Equally advantageously, the drying step e) results in the subsequent production of a final dried product with a moisture content such that it can be stored at room temperature for a medium to long period of time.

Moreover, in a particularly advantageous manner, both during the stabilization step d) and during the drying step e), these strips of vegetable do not suffer any deterioration from an organoleptic point of view.

In addition, the nest-shaped food product thus obtained comprising said dried strips of vegetable has a fiber content comparable to that of the fresh vegetable used as the raw material for carrying out this process.

Furthermore, the nest-shaped food product which can be obtained by this process is easily divided into portions and can be rehydrated by immersion in hot or boiling water for a few minutes, i.e. by a cooking technique similar to that used for fresh or dried durum wheat flour pasta, resulting in a product suitable for consumption which is not only tasty, but is also genuine and healthy.

In fact, once rehydrated as mentioned above, the product which can be obtained by the present process has organoleptic characteristics in terms of taste entirely attributable to those of the fresh-harvested vegetable suitably cooked shortly after harvesting, and also has a pleasantly full-bodied consistency when tasted.

Preferably, during said cutting step b), said at least one fresh vegetable is cut into strips with an average length more than 15 times the width of said strips, more preferably an average length more than 30 times the width of said strips, and even more preferably an average length more than 50 times the width of said strips.

In fact, the aforementioned cutting step b) aims to reduce the size of at least one fresh vegetable, namely a portion of a plant such as a garden vegetable, so as to obtain strips similar to spaghetti, tagliatelle, noodles, taglierini, spaghetti alla chitarra or any type of fresh or dried pasta which have a thin and elongated form, similar to strips, strands or webbings.

In a particularly preferred manner, during the aforementioned cutting step b), the at least one fresh vegetable is cut into strips having an average width of between 0.2 cm and 0.5 cm.

For example, in the case of a spaghetti-like form, said at least one fresh vegetable is cut into strips with a length of about 22 cm, a width of about 0.2 cm and a thickness of about 0.2 cm; in the case of a form similar to that of tagliatelle, said at least one fresh vegetable is cut into strips with a length of about 22 cm, a width of about 0.4 cm and a thickness of about 0.2 cm; in the case of a form similar to that of spaghetti alla chitarra, said at least one fresh vegetable is cut into strips with a length of about 22 cm, a width of about 0.4 cm and a thickness of about 0.4 cm.

The maximum average length of said strips of vegetable depends on the length of the plant portion selected and provided during said step a).

In particular, during the cutting step b), said vegetable is cut into strips by the action of a blade, for example the blade of a spiralizer, so as to obtain spiral-shaped strips of at least one fresh vegetable.

Advantageously, by carrying out the cutting step b) in the manner mentioned above, it is possible to obtain strips of at least one vegetable with an average length greater than the average length of the plant portions selected and provided during step a).

Advantageously, the cutting step b) is suitable for obtaining a fresh semi-finished vegetable in the form of strips, preferably spiral strips, where this specific shape allows the subsequent feeding step c), stabilization step d) and drying step e) to be effectively carried out.

In particular, during said feeding step c), the strips of at least one fresh vegetable can be easily placed in the perforated mold, occupying the volume of the latter evenly and thus ensuring the formation of a nest comprising strips of vegetable.

Specifically, when the strips of fresh vegetable are fed in metered amounts into the perforated mold, the strips of vegetable are fold together randomly, intersecting and entangling with each other, forming numerous interstices with the adjacent vegetable strips.

Because of the intersecting and entangling action of the vegetable strips, once the strips are dried during said step e), a nest is obtained such that it has numerous small gaps or interstices between the dried strips of vegetable and maintains the desired shape during the whole of its storage time.

Moreover, owing to the presence of the aforementioned gaps, firstly the saturated steam during the aforementioned stabilization step d) and then the flow of hot air during the aforementioned drying step e) may easily reach uniformly all the strips of vegetable placed in the perforated mold.

Basically, since during step b) the at least one fresh vegetable is cut into strips, preferably spiral-shaped strips, it is possible to obtain a nest in which the strips of vegetable have been efficiently subjected to the aforementioned stabilization step d) and drying step e), so as to ensure a final product with a uniform percentage moisture content: because of the uniform distribution of the moisture, the final product which can be obtained by means of the process according to the present invention has a uniform appearance and color, which is appropriate and corresponds to the portion of vegetable that has been cut and, in particular, has a rehydration time which is also uniform in all of its parts.

When it is cooked in boiling water before consumption by the end user, it is very important that the nest obtainable by means of the process according to the present invention should have a uniform rehydration and cooking time, so as to give an impression of quality when consumed, in particular a cooked product with a consistency in terms of taste and digestibility which is optimum in all parts thereof.

Moreover, owing to the uniform moisture content of all its parts, a high degree of stability from the microbiological point of view and optimum organoleptic qualities of the nest comprising strips of dried vegetables thus obtained are ensured during the whole storage period.

It should also be noted that, in a particularly advantageous manner, the feeding step c) also ensures that the subsequent stabilization step d) and drying step e) may be effectively performed. In fact, owing to the holes in said perforated mold, contact of the vegetable mass thus fed in metered amounts and placed in said perforated mold with the saturated steam during the stabilization step d) and with the flow of hot air during the drying step e) is facilitated.

Preferably, in the aforementioned feeding step c), said strips of at least one vegetable are placed in the perforated mold in a quantity of between 60 g and 80 g, more preferably between 65 g and 75 g, and even more preferably equal to about 70 g.

Preferably, said feeding step c) may be performed automatically.

Preferably, in the feeding step c), said perforated mold has a cylindrical shape.

In particular, said perforated mold has a bottom and a side wall, where both the bottom and the side wall are perforated.

More preferably, the bottom of said perforated mold may be flat or, alternatively, may be concave, for example it may have the shape of a semi-spherical cap.

Advantageously, said cylindrical shaped mold is particularly useful when the process according to the present invention is carried out automatically.

In fact, precisely owing to the shape of the mold, during said feeding step c) it is not necessary to modify the arrangement inside the mold of the strips of the at least one vegetable thus fed in metered amounts, as they already have a nest-shaped distribution.

Even more preferably, in said feeding step c) the aforementioned cylindrical shaped perforated mold has a diameter between 7 cm and 12 cm, more preferably between 8 cm and 10 cm, and a depth of between 1.5 cm and 4 cm, preferably between 2.5 cm and 4 cm.

In an equally preferred manner, in said feeding step c), the perforated mold has holes, which are more preferably round or elliptical, with an average size of between 1.0 mm and 2.0 mm. In a particularly preferred manner said perforated mold is made of a metal mesh.

Equipment which may be used to carry out said automatic feeding step consists, for example, of the automatic filling machines produced by the company Multi-Fill Inc., such as that identified by the code MPFSH-075.

In a method of implementing the process according to the invention, after the aforementioned cutting step b), said strips of vegetable are immersed in an aqueous solution comprising an ingredient capable of maintaining or enhancing the organoleptic characteristics of said at least one vegetable. Said aqueous solution may be, for example, a slightly acid solution, a salt solution and/or sugar solution.

According to another method of implementing the process according to the invention, after the aforementioned stabilization step d), said strips of vegetable are immersed in an aqueous solution comprising an ingredient capable of maintaining or enhancing the organoleptic characteristics of said at least one vegetable. Said aqueous solution may be, for example, a slightly acid solution, a salt solution and/or sugar solution.

In an equally preferred manner, the aforementioned thermal stabilization step d) is carried out at a temperature of between 100° C. and 105° C. for a time of between 1.5 minutes and 3 minutes.

Preferably, in the aforementioned drying step e), said strips of at least one vegetable are dried for a time of between 30 minutes and 20 hours.

More preferably, in said drying step e), said strips of vegetable are struck by a flow of hot air having a speed of between 20 m/s and 30 m/s, preferably equal to 25 m/s, at a controlled temperature of between 75° C. and 85° C. and for a time of between 40 minutes and 80 minutes.

Advantageously, when said drying step e) is carried out in accordance with this latter embodiment, owing to the high speed and convective movements of the air flow striking them, water is rapidly extracted from said strips of vegetable, causing the immediate evaporation thereof.

Specifically, according to this latter embodiment, said strips of vegetable are dehydrated by means an impingement drying process in which they are struck by a flow of hot air emitted from nozzles placed in their vicinity, i.e. at a distance of between about 5 cm and 10 cm from them.

In particular, during this impingement drying process, the peripheral layer of air surrounding the strips of garden vegetables is broken by the flow of hot air which is emitted from these nozzles and which thus strikes the surface of the strips of vegetables, increasing the speed of heat transfer and allowing an efficient removal of the moisture contained within the strips of vegetables.

In an equally preferred manner, during the drying step e), said strips of vegetable are struck by a flow of hot air having a speed of between 1.2 m/s and 1.8 m/s, more preferably equal to 1.5 m/s, at a controlled temperature of between 70° C. and 90° C. and for a time of between 10 hours and 18 hours.

For the purposes of this invention, the expression "controlled temperature" is understood as meaning that said drying step e) is carried out by keeping the strips of at least one vegetable at a fixed and well-defined temperature value throughout the drying period; specifically, the strips of vegetable are dehydrated in a uniform manner so as to obtain a nest-shaped food product with a uniform moisture content.

In a particularly preferred manner, in drying step e), said strips of vegetable are dried until they have a moisture content of between 11% and 14% by weight of their total weight, more preferably a moisture content equal to about 12% by weight of their total weight.

According to a preferred embodiment, after the aforementioned stabilization step d) and before said drying step e), strips of optionally pre-cooked fresh durum wheat semolina pasta are fed in metered amounts into the aforementioned perforated mold, mixing them with said strips of at least one vegetable, said strips of fresh durum wheat semolina pasta having a shape and size completely similar to those of said strips of vegetable.

In this way, following the aforementioned drying step e), it is possible to obtain a nest comprising both dried strips of durum wheat semolina pasta and dried strips of vegetable, providing a food product which can be stored for a long time at room temperature and which is more complete from a nutritional point of view.

In fact, according to this last embodiment of the present process, by feeding metered amounts of strips of fresh durum wheat semolina pasta together with said strips of at least one fresh vegetable and, subsequently, drying both the former and the latter during the aforementioned drying step e), a food with a uniform moisture content is obtained, avoiding any exchange of moisture between the vegetable ingredient and the pasta ingredient, which are thus uniformly dried.

Advantageously, although the fresh pasta generally has a moisture content less than that of the strips of at least one vegetable, since the drying step e) takes place under controlled temperature conditions, the drying treatment can be prolonged to achieve the desired degree of drying of the vegetable without causing any deterioration of the pasta itself.

As described above with reference to a nest with only a vegetable ingredient, the nest which may be obtained by means of this last embodiment can be rehydrated by means of immersion in hot or boiling water for a few minutes, i.e. using a cooking technique similar to that of fresh or dried durum wheat semolina pasta, obtaining a ready-to-eat food product that is not only genuine and healthy, but also has optimum organoleptic characteristics.

Precisely because of the common drying step carried out on them, said strips of durum wheat semolina pasta and said strips of at least one vegetable have a comparable rehydration time, so as to obtain a food suitable for consumption which is very pleasant from the point of view of its consistency when tasted, as will be more fully explained below with reference to the detailed description.

In addition, a food suitable for consumption comprising most of the nutritional substances necessary for the preparation of a healthy and balanced meal is obtained, both owing to the fibers, mineral salts and other nutrients present in the garden vegetable, and because of the starch and protein component of the pasta.

Preferably, the aforementioned strips of fresh durum wheat semolina pasta are pre-cooked and are obtained by subjecting them to a parboiling treatment, using saturated steam at a temperature of between 95° C. and 105° C., for a time of between 6 minutes and 10 minutes, more preferably equal to about 8 minutes.

Advantageously, when the strips of fresh durum wheat semolina pasta fed in metered amounts together with said strips of vegetable are pre-cooked, the following drying step e) is carried out more effectively, avoiding any disintegration of the fresh pasta ingredient.

In fact, during the aforementioned parboiling step, the gelatinization of the starch is favored inside the fresh pasta ingredient, so as to strengthen the structure of the dough before the subsequent drying step.

According to a preferred embodiment of the present process, the aforementioned nest-shaped food product comprising dried strips of vegetable may have a water activity value (Aw) less than or equal to 0.4.

More preferably, said nest-shaped food product comprising dried strips of vegetable has a water activity value (Aw) between 0.3 and 0.4.

The aforementioned technical problem is also solved by a nest-shaped food product comprising dried strips of at least one vegetable, storable at room temperature, optionally in a controlled atmosphere, for a period of at least 7 days, obtainable by means of the process according to the present invention, having a water activity value (Aw) less than or equal to 0.4, preferably of between 0.3 and 0.4.

According to a preferred embodiment, the food product according to the present invention can be stored at room temperature for a time period of at least 30 days, preferably for at least 60 days, more preferably for at least 120 days, and in a particularly preferred manner for at least 210 days.

In a particularly preferred manner, the food product according to the present invention can be stored at room temperature for a time period of up to 12 months.

In particular, said nest-shaped food product is free from preservatives or antimicrobial agents.

In an equally preferred manner, the aforementioned nest-shaped food product comprising dried strips of a vegetable has a rehydration time in boiling water at atmospheric pressure of between 2.5 minutes and 12 minutes, more preferably of between 2.5 minutes and 4 minutes, and particularly preferably equal to 3 minutes.

The present invention is further described below in the detailed description, with reference to some examples of embodiment provided hereinbelow by way of a non-limiting example.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

As mentioned above, the process according to the present invention has proved to be particularly effective in the production of a nest-shaped food product comprising strips of at least one vegetable storable at room temperature for at least 7 days, in particular it was possible to obtain nest-shaped food products storable for 210 days.

As will be seen from the examples below, the process according to the present invention was successfully carried out using different vegetable raw materials, in particular garden vegetables, obtaining in all cases a final product which is excellent from the point of view of stability at room temperature, as well as its organoleptic characteristics.

Example 1

First of all, about 500 g of fresh red turnips or beetroot were procured, where the rough and residual parts of the stem, i.e. all portions of the garden vegetable which were generally not edible, had previously been removed.

The fresh garden vegetable portions were carefully washed under a jet of water with a suitable pressure at room temperature.

The outer cuticle and residual growths were then removed from the thus washed garden vegetable portions.

The vegetable portions thus prepared were cut into strips, using an automatic spiral cutter, Streamer Compact/Compact Spiralizer model, supplied by the company Turatti, obtaining strips of vegetable with an average length of about 20 cm, a width of 0.4 cm and a thickness of 0.2 cm.

Thereafter, about 70 g of beetroot strips prepared in this way were automatically fed in metered amounts, placing them in a cylindrical perforated mold with a flat bottom and a diameter of about 10 cm and a depth of about 3.5 cm.

Figure 1:
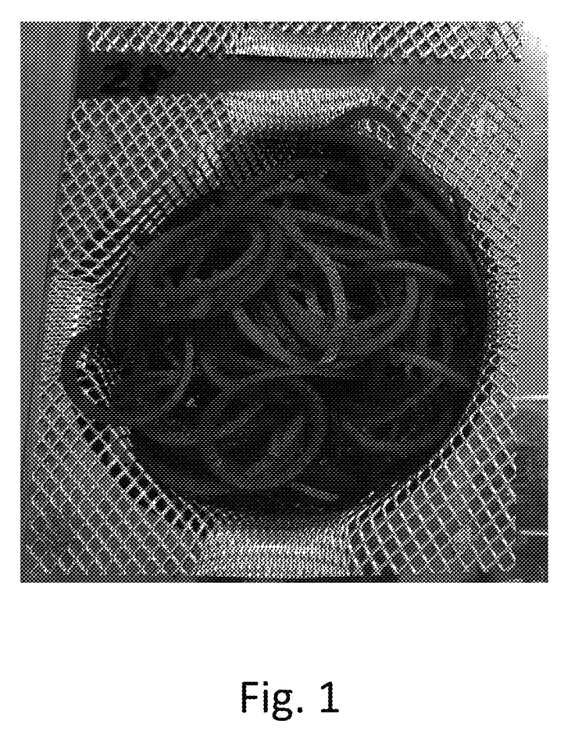
FIG. 1 shows strips of a vegetable placed in a perforated mold, as required by the feeding step c) of the process according to the present invention.

FIG. 1 shows beetroot strips arranged inside the aforementioned mold after the feeding step.

Subsequently, a stabilization heat treatment was carried out inside a UNOX CHEF TOP 10 oven, this operation being performed in a chamber saturated with steam at a temperature of 100° C. for 2 minutes.

The beetroot strips thus stabilized were dried inside a conveyor drier, model ECP-TO (year of manufacture: 1996), produced by the company FEN—New Food Engineering S.p.A., using an impingement drying process based on the following specifications:
  2 meters length of drying surface;
  5 cm distance between hot air emission nozzle and product;
  temperature=70° C.;
  speed=25 m/s;
  drying time=45 minutes.

Figure 2:
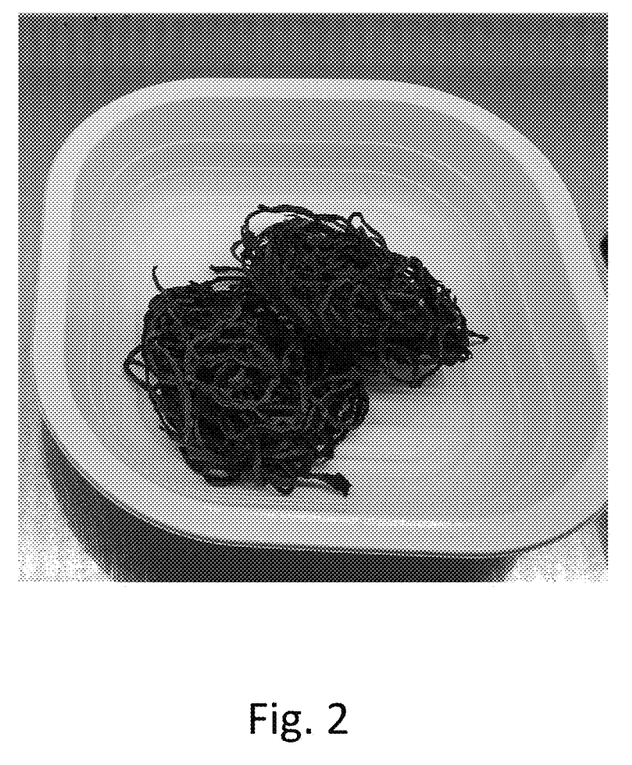
FIG. 2 shows a nest-shaped food product comprising strips of a first type of vegetable, prepared in accordance with the process of the present invention.

With reference to FIG. 2, a nest comprising strips of beetroot and weighing 8 g, with an average diameter of about 8 cm and a thickness of 1.5 mm, was obtained. As can be seen, the strips of vegetable thus dried had a bright, naturally purplish-red color, very similar to the color of the fresh vegetable.

The nest-shaped food product thus obtained had a relative moisture content of 12% and a water activity value (Aw) of 0.43.

The nest comprising beetroot strips was then rehydrated in boiling water for 3 minutes.

The beetroot strips thus rehydrated retained the color of the original finished product and had a naturally puffy appearance. In addition, the ready-to-eat product thus obtained has a crunchy and naturally fibrous consistency, typical of the original fresh garden vegetable.

Example 2

First of all, about 300 g of fresh carrots with an average ripening period of 85-90 days were procured; the ends of each root, which are normally not edible, were removed.

Each portion of the garden vegetable was carefully washed under a jet of water with a suitable pressure at room temperature.

The outer cuticle was then removed from the washed carrots.

The portions of fresh carrots thus obtained were cut by the cutting action of a blade, specifically using a manual cutter, i.e. the spiral vegetable slicer produced by the company Salter, model BW04294, in order to obtain strips of carrots with a spiral-shaped form.

The central part of the taproot, having a whitish color and a harder consistency, was discarded.

The strips of carrot thus obtained had the following dimensions: length=22 cm; width=0.2 cm; thickness=0.2 cm.

Specifically, the strips of carrot thus obtained ranged in length from 3 cm to 25 cm.

Thereafter about 70 g of carrot strips thus prepared were supplied and were then weighed and placed in a flat-bottomed cylindrical perforated mold with a diameter of about 9 cm and a depth of about 3 cm.

Subsequently, a stabilization heat treatment was carried out inside a UNOX CHEF TOP 10 oven, performing this operation in a chamber saturated with steam at a temperature of 105° C. for 2 minutes.

The strips of carrots thus stabilized were dried in a conveyor drier, model ECP-TO (year of manufacture: 1996), produced by the company FEN—New Food Engineering S.p.A., using an impingement drying process based on the following specifications:
  2 meters length of drying surface;
  8 cm distance between the hot air emission nozzle and product;
  temperature=75° C.;

speed=25 m/s;
drying time=50 minutes.

Figure 3:
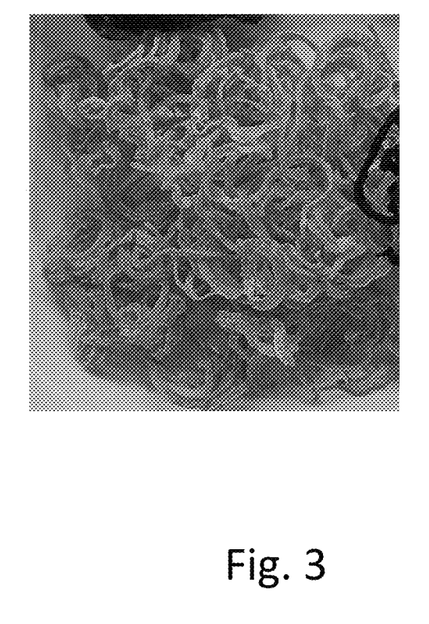
FIG. 3 shows a nest-shaped food product comprising strips of a second type of vegetable, prepared in accordance with the process according to the present invention.

With reference to FIG. 3, a nest of carrot strips with a dry weight of 8 g, an average diameter of about 8 cm and a thickness of 2.5 mm was obtained. A reduction in weight of about 88% was calculated compared to the weight of the starting raw material. The strips of carrots thus dried had a bright orange color, which was completely natural and similar to that of the original vegetable.

The nest-shaped food product thus obtained had a relative moisture content of 11.5% and a water activity value (Aw) of 0.42.

The nest of carrot strips was then rehydrated in boiling water for 3 minutes.

The rehydrated carrot strips retained the color of the original finished product and had a naturally puffy appearance. In addition, the carrot strips thus obtained had a full-bodied consistency.

Example 3

In exactly the same way as in Example 2, strips of carrots were obtained in accordance with steps a), b), c) and d) of the process according to this invention.

At the same time, using only water and durum wheat semolina, a dough of durum wheat semolina was prepared and was then extruded to obtain strips of dough with the following dimensions: length=25 cm; width=0.2 cm; thickness=0.1 cm.

To facilitate the subsequent operations and correctly set the subsequent parboiling treatment, the strips of dough thus obtained were placed in a nest arrangement on a metal tray.

In order to ensure the same drying time for both food ingredients (strips of fresh durum wheat semolina pasta and strips of carrots), the strips of dough thus obtained and arranged on a metal baking tray were subjected to a steam pre-cooking treatment using a ventilated steam oven UNOX CHEFTOP having a chamber saturated with steam, set to the temperature of 105° C. for a duration of 8 minutes, obtaining strips of fresh, pre-cooked, durum wheat semolina pasta arranged on a perforated baking tray during the treatment.

Then, 40 g of carrot strips, obtained as described above, and 40 g of fresh pasta in the form of strips were placed inside a cylindrical perforated mold with a diameter of 10 cm and a depth of 3 cm. The two ingredients were mixed together in such a way as to distribute them evenly in the mold and shape the assembly of pasta and carrot strips into a form of a nest.

Thereafter, this assembly of pasta and carrot strips inside the mold was dried inside a conveyor drier, model ECP-TO (year of manufacture: 1996), produced by the company FEN—New Food Engineering S.p.A., by means of an impingement drying process based on the following specifications:

2 meters length of drying surface;
5 cm distance between hot air emission nozzle and product;
temperature=70° C.;
speed=25 m/s;
drying time=60 minutes.

In particular, at halfway through the required drying time, the semi-rigid product was turned over to ensure uniform drying.

Figure 4:
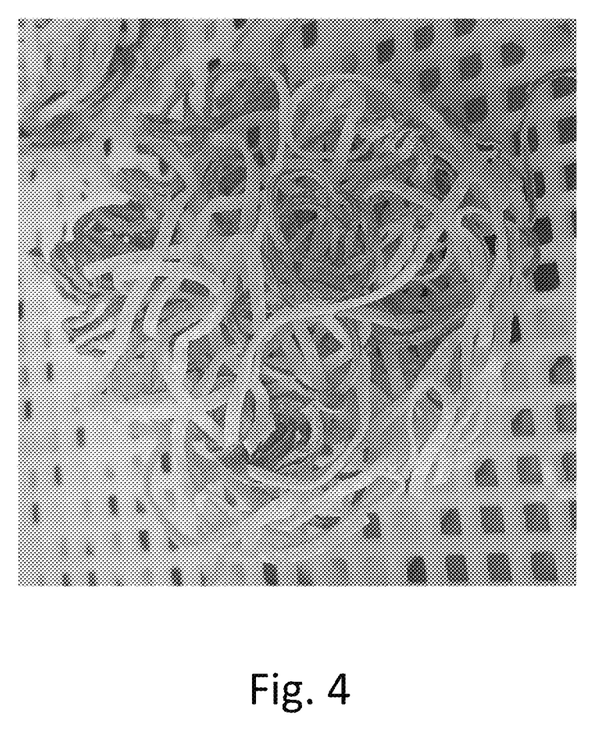
FIG. 4 shows the nest-shaped food product obtained according to the process of the present invention comprising strips of a vegetable and strips of durum wheat semolina pasta.

With reference to FIG. 4, a nest-shaped food product comprising strips of carrots and strips of durum wheat semolina pasta, with a weight of 34 g, was obtained.

The moisture content of both the pasta component and the vegetable component of the nest thus obtained was about 12.5% by weight of the total weight of the product.

The strips of carrots included in the nest thus obtained had a completely natural bright orange color, similar to the color of the original vegetable.

The carrot and pasta nest was then rehydrated in boiling water for 3 minutes.

The strips of carrots thus rehydrated retained the color of the original finished product and had a naturally puffy appearance. At the same time, the rehydrated strips of carrot had an extended form lengthwise, while remaining slightly wavy.

The consistency of the ready-to-eat product thus obtained was very pleasant, owing to the slight contrast in consistency, during tasting, between the crunchier strips of carrot and the softer strips of pasta. The taste of the ready-to-eat product was equally pleasant and balanced; in particular, the taste of the strips of carrot was not stronger than that of the strips of pasta and vice versa.

The invention claimed is:

1. A process for the production of a nest-shaped food product comprising strips of a dried vegetable, which comprises the steps of:
   a) providing a fresh vegetable;
   b) cutting into strips said fresh vegetable, previously washed and optionally peeled;
   c) feeding said strips of fresh vegetable in metered amounts into a perforated mold thereby obtaining a nest-shaped distribution of said strips with a plurality of interstices between said strips;
   d) subjecting said nest-shaped distribution of said strips of vegetable to a stabilization heat treatment by means of saturated steam at a temperature of between 100° C. and 105° C., for a time of between 1 minute and 3 minutes to inactivate enzyme activity in said strips while avoiding organoleptic deterioration of said strips of said vegetable; and
   e) drying said thermally stabilized strips of vegetable in said nest-shaped distribution and contained in said perforated mold by means of a flow of hot air at a temperature of between 65° C. and 90° C. thereby obtaining said nest-shaped food product comprising dried strips of vegetable with a moisture content of between 8% and 16% by weight of their total weight;
   wherein said plurality of interstices between said strips of vegetable facilitates uniform steaming and drying of said strips of vegetable.

2. The process according to claim 1, wherein said fresh vegetable is a portion of a plant belonging to a family of the group consisting of Cucurbitacee, Brassicacee, and Liliacee and/or belonging to a species selected from the group consisting of *Daucus carota, Beta vulgaris, Brassica rapa* and *Raphanus sativus*.

3. The process according to claim 2, wherein said fresh vegetable is a portion of plant of a garden vegetable selected from the group consisting of orange carrot, purple carrot, yellow carrot, beetroot, white turnip, daikon, broccoli stems, pumpkin, zucchini and onion.

4. The process according to claim 1, wherein in said cutting step b) said fresh vegetable is cut into strips having an average length more than 15 times the width of said strips.

5. The process according to claim 1, wherein during said cutting step b) said fresh vegetable is cut into strips having an average width of between 0.2 cm and 0.5 cm.

6. The process according to claim 1, wherein in said feeding step c) said strips of vegetable are placed in said perforated mold in a quantity of between 60 g and 80 g.

7. The process according to claim 1, wherein in said feeding step c) said perforated mold has a cylindrical shape.

8. The process according to claim 7, wherein in said feeding step c) said perforated mold has a diameter of between 7 cm and 12 cm, and a depth of between 1.5 cm and 4 cm.

9. The process according to claim 1, wherein in said feeding step c) said perforated mold has holes with an average size of between 1 mm and 2 mm.

10. The process according to claim 1, wherein after said cutting step b) said vegetable strips are soaked in an aqueous solution comprising an ingredient for maintaining or enhancing the organoleptic properties of said vegetable, said aqueous solution being a slightly acid solution, a salt solution or a sugar solution.

11. The process according to claim 1, wherein after said thermal stabilization step d) said vegetable strips are soaked in an aqueous solution comprising an ingredient for maintaining or enhancing the organoleptic properties of said vegetable, said aqueous solution being a slightly acid solution, a salt solution or a sugar solution.

12. The process according to claim 1, wherein in said drying step e) said strips of vegetable are struck by a flow of hot air having a speed of between 20 m/s and 30 m/s, at a temperature of between 75° C. and 85° C. and for a time of between 40 minutes and 80 minutes.

13. The process according to claim 1, wherein in said drying step e) said strips of vegetable are struck by a flow of hot air having a speed of between 1.2 m/s and 1.8 m/s at a temperature of between 70° C. and 90° C. and for a time of between 10 hours and 18 hours.

14. The process according to claim 1, wherein in said drying step e) said strips of vegetable are dried until they have a moisture content of between 11% and 14% by weight of their total weight.

15. The process according to claim 1, wherein after said thermal stabilization step d) and before said drying step e) strips of fresh durum wheat semolina pasta are fed in metered amounts into said perforated mold, mixing them with said strips of vegetable, said strips of fresh durum wheat semolina pasta having a shape and size completely similar to those of said strips of vegetable.

16. The process according to claim 15, wherein said strips of fresh durum wheat semolina pasta are pre-cooked and are obtained by subjecting strips of durum wheat semolina pasta to a parboiling treatment by means of saturated steam at a temperature of between 95° C. and 105° C., for a time of between 6 minutes and 10 minutes.

17. The process according to claim 1, wherein said food product has a water activity value (Aw) less than or equal to 0.4.

18. The process according to claim 17, wherein said food product has a water activity value (Aw) between 0.3 and 0.4.

* * * * *